(12) United States Patent
Scholten et al.

(10) Patent No.: US 8,735,722 B2
(45) Date of Patent: May 27, 2014

(54) END FITTING FOR A CABLE WITH SEALING PROTRUSION AND ENCLOSURE ASSEMBLY WITH END FITTING

(75) Inventors: Martijn Scholten, Elst (NL); Jacco Elenbaas, Heyningen (NL); Jarno Verhoeven, Rosmalen (NL); Marc Jansen, Steensel (NL)

(73) Assignee: TE Connectivity Nederland B.V., 'S-Hertogenbosch (NL)

( * ) Notice: Subject to any disclaimer, the term of this patent is extended or adjusted under 35 U.S.C. 154(b) by 142 days.

(21) Appl. No.: 13/171,288

(22) Filed: Jun. 28, 2011

(65) Prior Publication Data

US 2012/0285741 A1 Nov. 15, 2012

(30) Foreign Application Priority Data

May 10, 2011 (DE) .................... 20 2011 050 094 U

(51) Int. Cl.
*H02G 15/02* (2006.01)
*H01R 9/05* (2006.01)

(52) U.S. Cl.
USPC ..................... 174/77 R; 174/74 R; 174/82

(58) Field of Classification Search
USPC ............... 174/77 R, 73.1, 74 R, 75 R, 82
See application file for complete search history.

(56) References Cited

U.S. PATENT DOCUMENTS

| | | | | |
|---|---|---|---|---|
| 5,451,717 | A | * | 9/1995 | Itou ............................. 174/77 R |
| 6,053,753 | A | * | 4/2000 | Kunkle ........................ 439/275 |
| 6,116,938 | A | * | 9/2000 | Myer et al. .................... 439/353 |

* cited by examiner

*Primary Examiner* — Jayprakash N Gandhi
*Assistant Examiner* — Dion Ferguson
(74) *Attorney, Agent, or Firm* — Faegre Baker Daniels LLP

(57) ABSTRACT

The invention relates to an end fitting and an enclosure assembly with the end fitting, and with a sealing enclosure. In order to improve the reliability of the enclosure assembly, the invention provides that the end fitting is provided with a sealing protrusion and that a sealing section and a retention section of the sealing enclosure are arranged one behind the other in a connection direction.

17 Claims, 5 Drawing Sheets

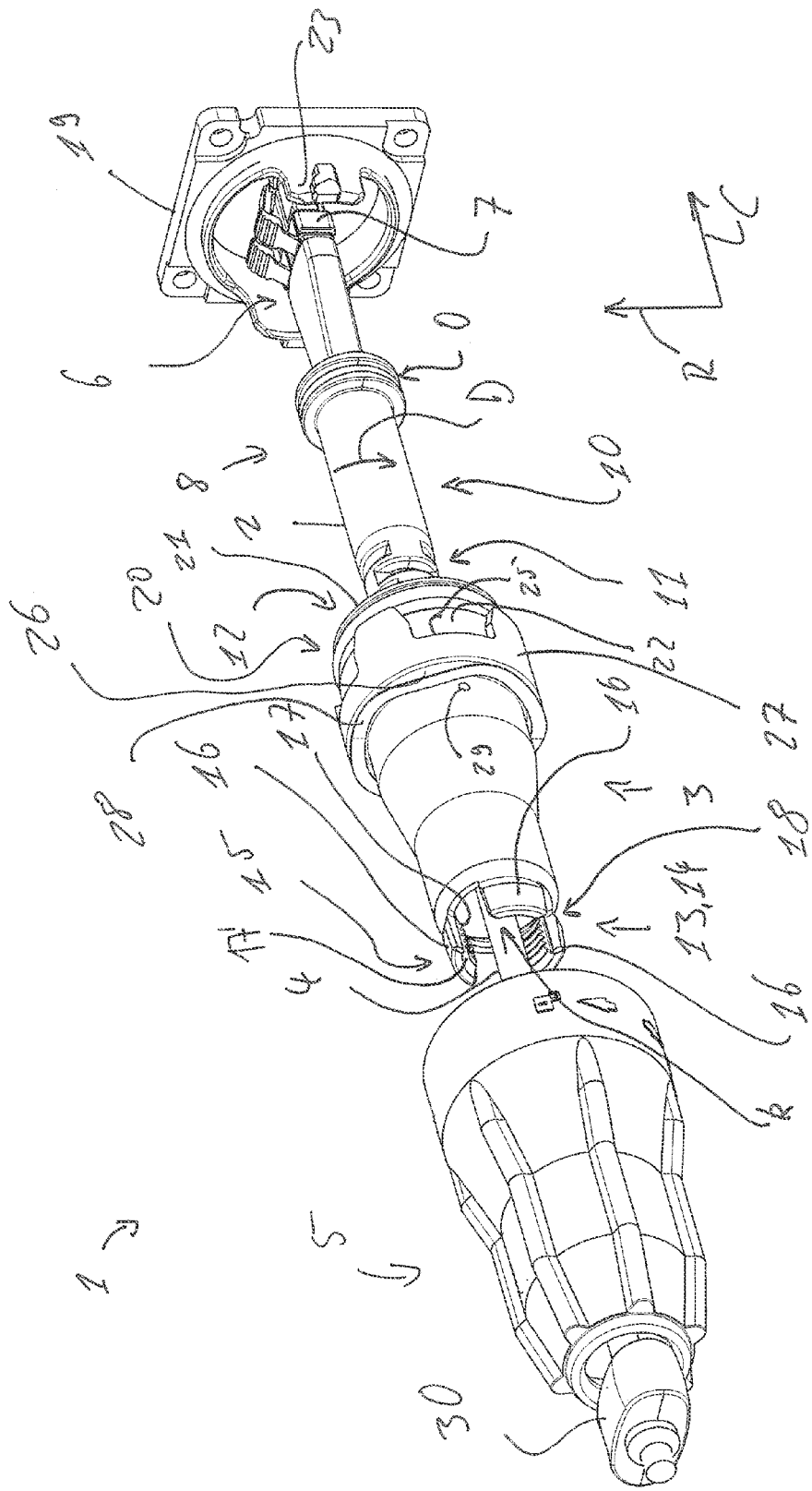

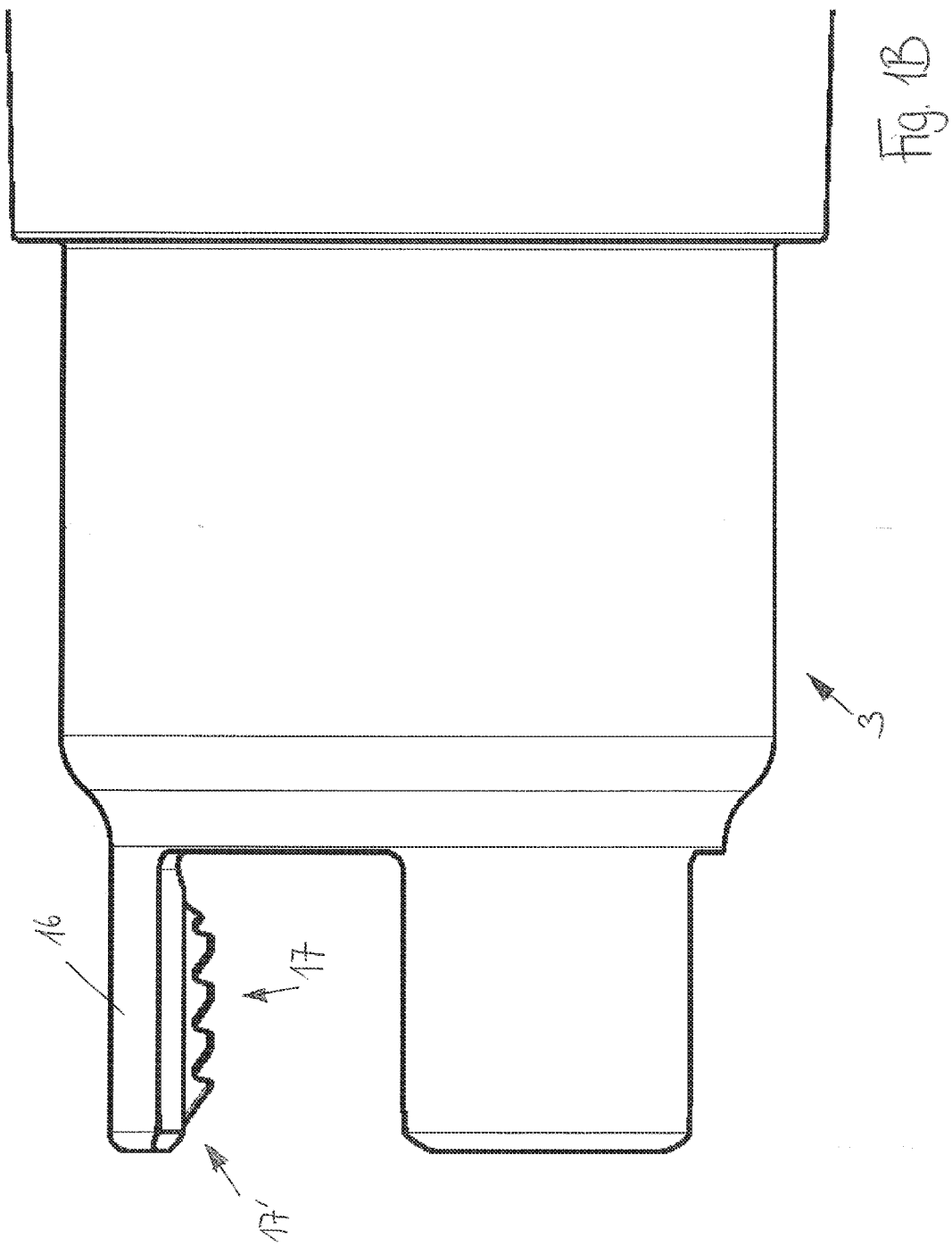

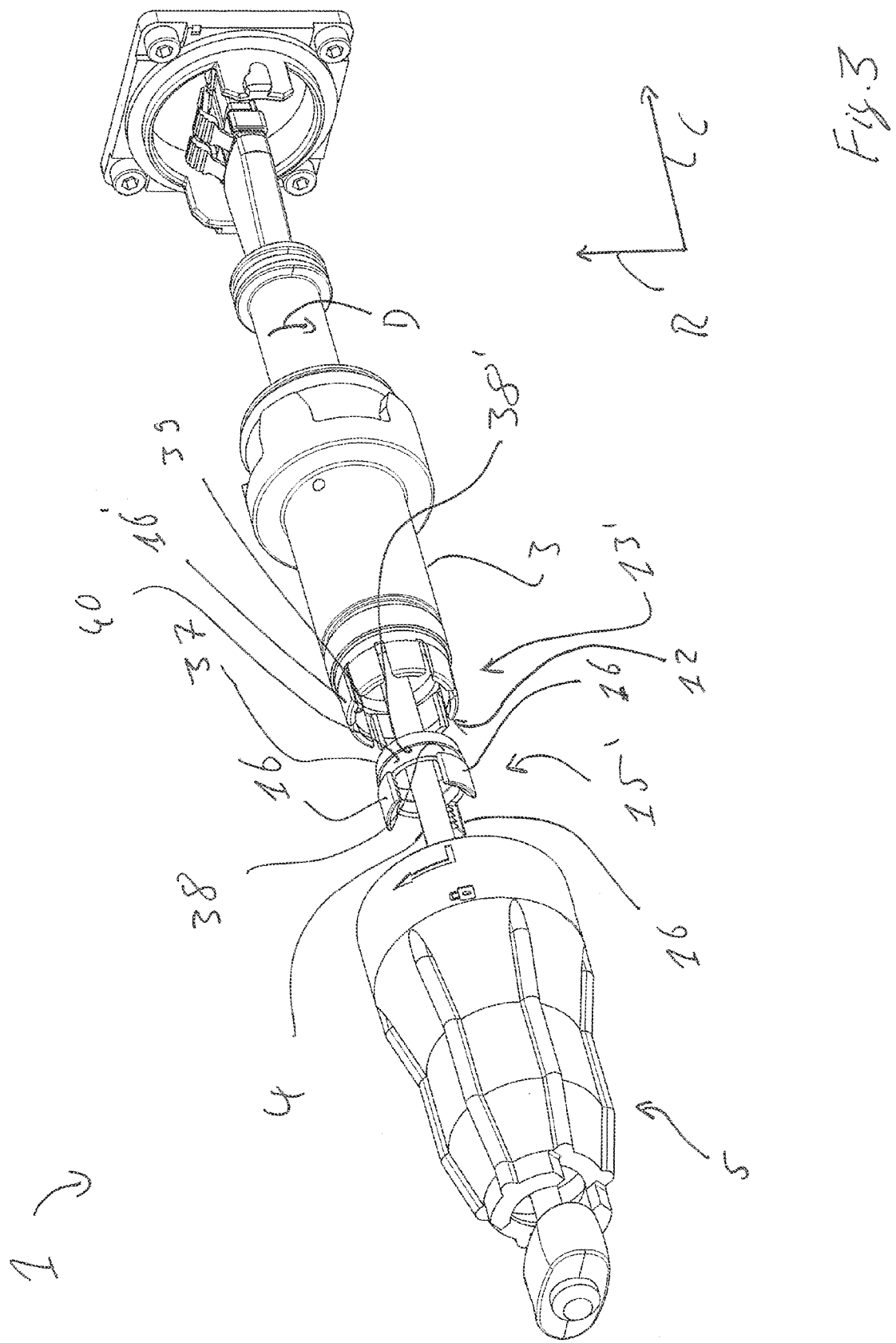

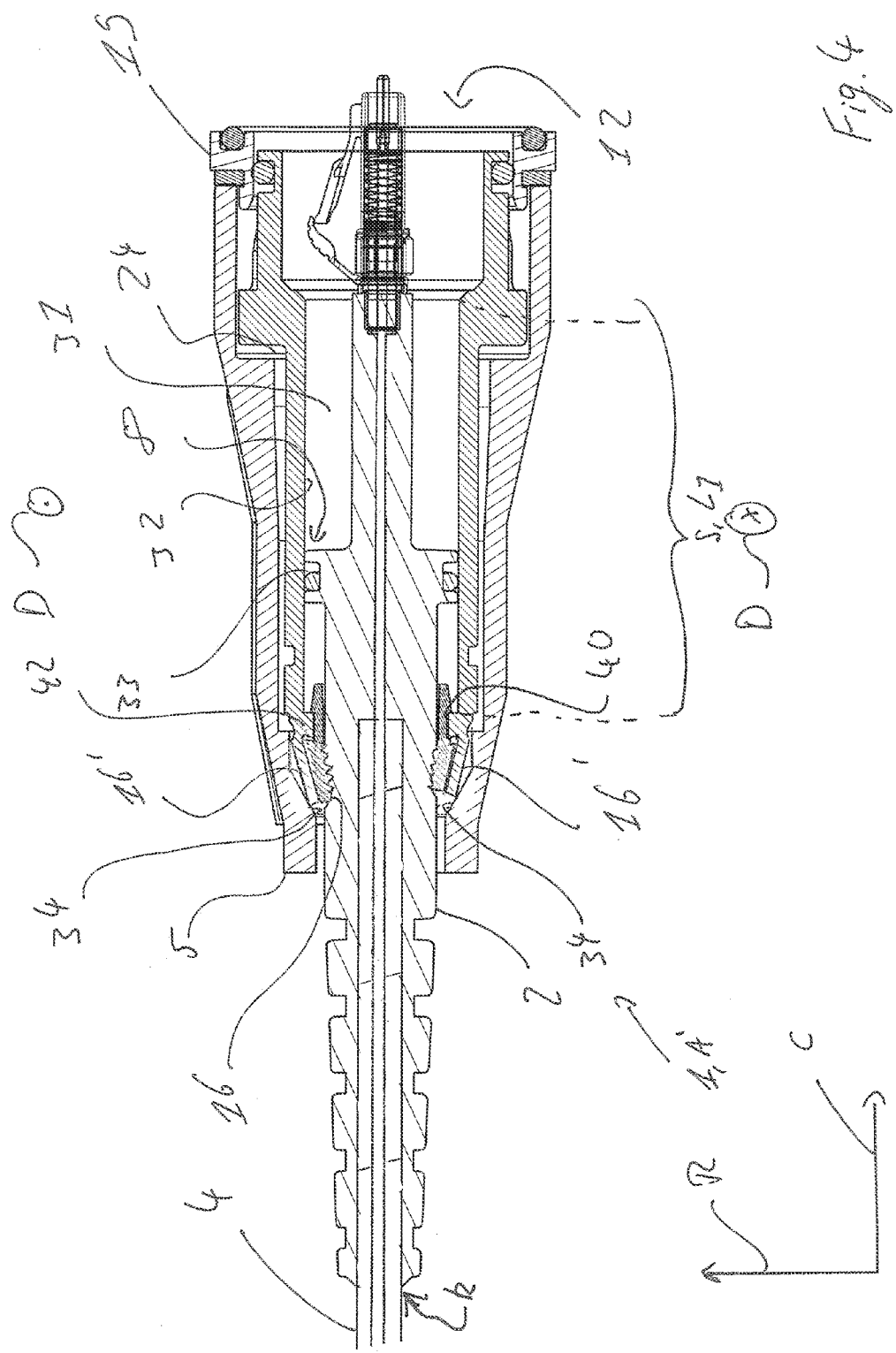

END FITTING FOR A CABLE WITH SEALING PROTRUSION AND ENCLOSURE ASSEMBLY WITH END FITTING

BACKGROUND

The present invention relates to a sealed connection assembly.

More particularly, the present invention relates to an end fitting for a cable, with a cable channel extending in a connection direction towards a connection end of the end fitting, in which the cable can at least sectionwise be arranged. Furthermore, the invention relates to an enclosure assembly for connecting a cable to a mating closure, the enclosure assembly comprising a sealing enclosure with a cable volume adapted to at least sectionwise receive an end fitting for a cable, the cable volume being open at least in a connection direction, in which the enclosure assembly can be connected to the mating closure, the enclosure assembly further comprising the end fitting for the cable, the end fitting extending into the cable volume of the sealing enclosure and being affixed and sealingly connected to the sealing enclosure.

End fittings and enclosure assemblies with end fittings and sealing enclosures are known in the art. The end fitting may be shaped as a strain relief that is affixable to the enclosure, which can be attached to the mating closure. Without such a strain relief, the cable tends to slip out of the enclosure assembly, which may result in a malfunction of a plug connection comprising a connector connected to the cable.

Sealing the enclosure assembly against e.g. moisture is difficult to achieve, as an enclosure assembly having a strain relief and having sealing means is difficult to design.

Hence, known enclosure assemblies often either comprise a strain relief or sealing means or the reliability of the strain relief and/or of the sealing means is compromised by the coexistence of the strain relief and the sealing means. Therefore, the known enclosure assemblies are unreliable, as their function may be affected by humidity or by mechanical forces acting onto the cable.

In view of these disadvantages of the known enclosure assemblies, an object underlying the invention is to provide an end fitting and an enclosure assembly with improved reliability.

SUMMARY

The object is achieved according to the invention for the end fitting mentioned in the beginning in that the end fitting is shaped with a sealing protrusion and/or a sealing groove for sealingly connecting a sealing enclosure of an enclosure assembly, the sealing protrusion and/or the sealing groove extending away from the cable channel in a radial direction of the end fitting. For the enclosure assembly mentioned in the beginning, the object is achieved according to the invention in that the end fitting is formed according to the invention and that the sealing enclosure comprises a sealing section for sealingly connecting the end fitting and a retention section for affixing the end fitting, the sealing section and the retention section being arranged one behind the other in the connection direction.

These simple solutions provide that the end fitting provides for sealing means in form of the sealing protrusion and that no separate sealing means are necessary, which may get displaced or lost. The sealing enclosure provides for a dedicated sealing section, which may in an assembled state of the enclosure assembly be sealingly connected to the sealing protrusion. Furthermore, the arrangement of the sealing section and of the retention section one behind the other in the connection direction results in a functional separation of the sealing function and the strain relief function, such that the design of the sealing section and the sealing protrusion as well of the retention section can be optimized for the respective functionality. Furthermore, as the sealing and the retention function is not to be provided by a single element, mechanical forces acting on the retention section do not negatively affect the sealing performance of the sealing section in combination with the sealing protrusion.

The solutions according to the invention can be combined as desired and further improved by the following embodiments that are in each case advantageous on their own.

According to a first possible embodiment, the sealing protrusion and/or the sealing groove may extend around the cable channel in a circumferential direction of the end fitting. Thus, the sealing protrusion and/or the sealing groove may be ring-shaped and may sealingly connect the sealing enclosure completely around the cable channel and in the circumferential direction. The sealing protrusion and/or sealing groove may be designated as fastening elements for a sealing element. The end fitting may be affixed to the sealing enclosure in a releasable manner.

In another advantageous embodiment, the sealing protrusion may comprise the sealing groove, the sealing groove having an open side that points away from the cable channel and in the radial direction of the fitting. The sealing groove may be adapted for at least sectionwise accommodating the sealing element, e.g. an O-ring, which in an unassembled state of the enclosure assembly may protrude out of the sealing groove in the radial direction. Using a sealing element like an O-ring enables that the end fitting can be produced of a material that alone may be too stiff for creating a tight sealing connection to the sealing enclosure. The stiff sealing protrusion, however, may be mechanically stable enough to position the sealing element in its sealing position. The sealing element, e.g. the O-ring may be optimized for creating a sealing connection between the end fitting and the sealing enclosure. In particular, the sealing element may be formed of an elastic material that is elastically deformable and can be brought in a humid tight contact with the end fitting and the sealing enclosure. Alternatively, the sealing element may be attached to the fastening element by a material-fit, and e.g. be co-injection-molded with the fastening element. The fastening element may be shaped such that the sealing element protrudes from the end fitting the radial direction.

In order to affix the end fitting in the sealing enclosure, the end fitting may in a further advantageous embodiment be formed with an affixing section that is adapted to be affixed to the sealing enclosure. For instance, the mechanical properties, e.g. the stiffness, and the dimensions of the affixing section may be optimized for collaborating with the retention section. The affixing section and the sealing section may be arranged one after the other in the connection direction thereby being arranged with respect to each other in order to interact with the retention section and the sealing section respectively. Such an arrangement enables to spatially separate the sealing function and the affixing function, resulting in the above mentioned advantages.

In order to be able to provide the strain relief functionality, the end fitting may be adapted to be affixed on the cable, e.g. on a sheath of the cable. For instance, the end fitting may be formed as an injection-molded part molded over the cable. Using the proper molding conditions, the end fitting adheres to the sheath and may even form a material-fit. Furthermore, injection-molding the end fitting is cheap.

In order to further improve the reliability, the end fitting may in a further advantageous embodiment be shaped as a bend protection for the cable. Dysfunctions caused by cable breaks are at least reduced by such an end fitting.

For sealingly connecting to the end fitting and in particular its sealing element, the sealing section of the sealing enclosure may in a further advantageous embodiment comprise a sealing duct with an inner sealing wall that surrounds the cable volume in the radial direction. The sealing duct may at least sectionwise be complementary to the end fitting and may in particular have a hollow cylindrical shape with the same or an only slightly greater diameter than the sealing protrusion or the sealing groove with the sealing element. In the connection direction, the sealing duct may have a length that allows for a sealing connection to the end fitting in a range of relative positions, the range extending from a position in which the end fitting has just entered the sealing duct to an end position in which the end fitting is arranged at least in the assembled state.

In the assembled state of the enclosure assembly, the sealing protrusion and/or the sealing groove of the end fitting may in a further advantageous embodiment be sealingly connected to the inner sealing wall of the sealing enclosure. In particular, the sealing protrusion and/or the sealing groove may be connected to the inner sealing wall by the sealing element, e.g. by the O-ring. The sealing element may be pressed between the sealing protrusion and the inner sealing wall and may sealingly connect the sealing protrusion and the inner sealing wall.

In order to facilitate a compact design of the enclosure assembly, the retention section may in a further advantageous embodiment be arranged at an end of the cable volume, the end facing against the contact direction. In particular when the connection end of the end fitting is provided with a plug and ends in the connection direction, the retention section at the end of the cable volume facing against the connection direction provides that mechanical forces acting onto the cable are absorbed by the sealing enclosure at entry of the cable into the sealing enclosure. Hence, the forces are not let through the sealing enclosure via the cable to the connector to a considerable extent but via the sealing enclosure to the mating closure. Furthermore, the sealing protrusion and/or the sealing groove can in the connection direction be arranged behind the retention section. Thus, also the sealing functionality is protected from mechanical forces acting onto the cable and absorbed by the retention section.

In another advantageous embodiment, the retention section may comprise a retention member with at least one resiliently deflectable holding tongue for holding the end fitting. The holding tongue may be pressed against the end fitting, thereby securing the location of the end fitting relative to the sealing enclosure by a force- or form-fit. In particular, the retention member may affix the end fitting at its affixing section relative to the sealing enclosure. The affixing section may be arranged at a distance to the sealing protrusion or at least before or behind the sealing protrusion, again separating the sealing from the affixing functionality.

The retention member may in another advantageous embodiment be an integral part of the sealing enclosure. For instance, the sealing enclosure may be an injection-molded part, which is produced simultaneously with the retention member in one shot. Hence, the sealing enclosure and the retention member can easily and at low cost be produced.

The retention member may in another advantageous embodiment be formed as a retention bushing, through which the cable volume may extend. As a bushing, the retention member may extend around the end fitting and may hold the end fitting on several sides, such that acting holding forces outweigh each other. The bushing may comprise one or several holding tongues that are equally distributed in the circumferential direction of the end fitting.

The holding tongues may be provided at their free ends or tips with a bevel-like ramp that preferably faces the cable and thus provides for a tapering cavity between the tongue and the cable, which facilitates the release of the holding tongues. By the bevel, the material thickness at the tip of the holding tongue may be reduced to less than the half of the maximum tongue thickness.

In order to be able to use the sealing enclosure with different end fittings, the retention member may in a further advantageous embodiment be shaped as a removable retention cartridge. The retention cartridge can be assembled with the sealing enclosure in the connection direction and can be exchanged against other retention cartridges with different dimensions. For instance, the sealing enclosure may be shaped with a retention section for holding the retention cartridge. The retention section of the sealing enclosure may even be designed to hold either the retention cartridge or the end fitting, such that the retention cartridge may be used as an adapter piece for the sealing enclosure for using with smaller end fittings. Alternatively, the retention cartridge may be held by the retention section by a snap connection. The retention cartridge and/or the retention section for holding the retention cartridge may be provided with one or more holding tongues that may be formed as the holding tongues of the sealing housing with the integrated retention member.

In a further advantageous embodiment, the enclosure assembly may comprise a coupling enclosure via which the sealing enclosure can be coupled to the mating closure. The coupling enclosure may furthermore act onto the at least one holding tongue and press the at least one holding tongue against the radial direction and towards the cable volume, i.e. against the end fitting or the retention cartridge in the assembled state of the enclosure assembly. The coupling enclosure may be coupled to the mating closure in a bayonet-manner.

BRIEF DESCRIPTION OF THE DRAWINGS

The invention will be described hereinafter, in more detail and in an exemplary manner using advantageous embodiments and with reference to the drawings. The described embodiments are only possible configurations in which, however, the individual features as described above can be provided independent of one another and can be omitted in the drawings:

FIG. 1A is a schematic perspective exploded view of an exemplary embodiment of the invention;

FIG. 1B shows a detail of FIG. 1A;

FIG. 3 is a schematic perspective exploded view of another embodiment of the invention;

FIG. 4 shows a schematic cross-sectional view of the embodiment of FIG. 3 in an assembled state.

Figure 2:
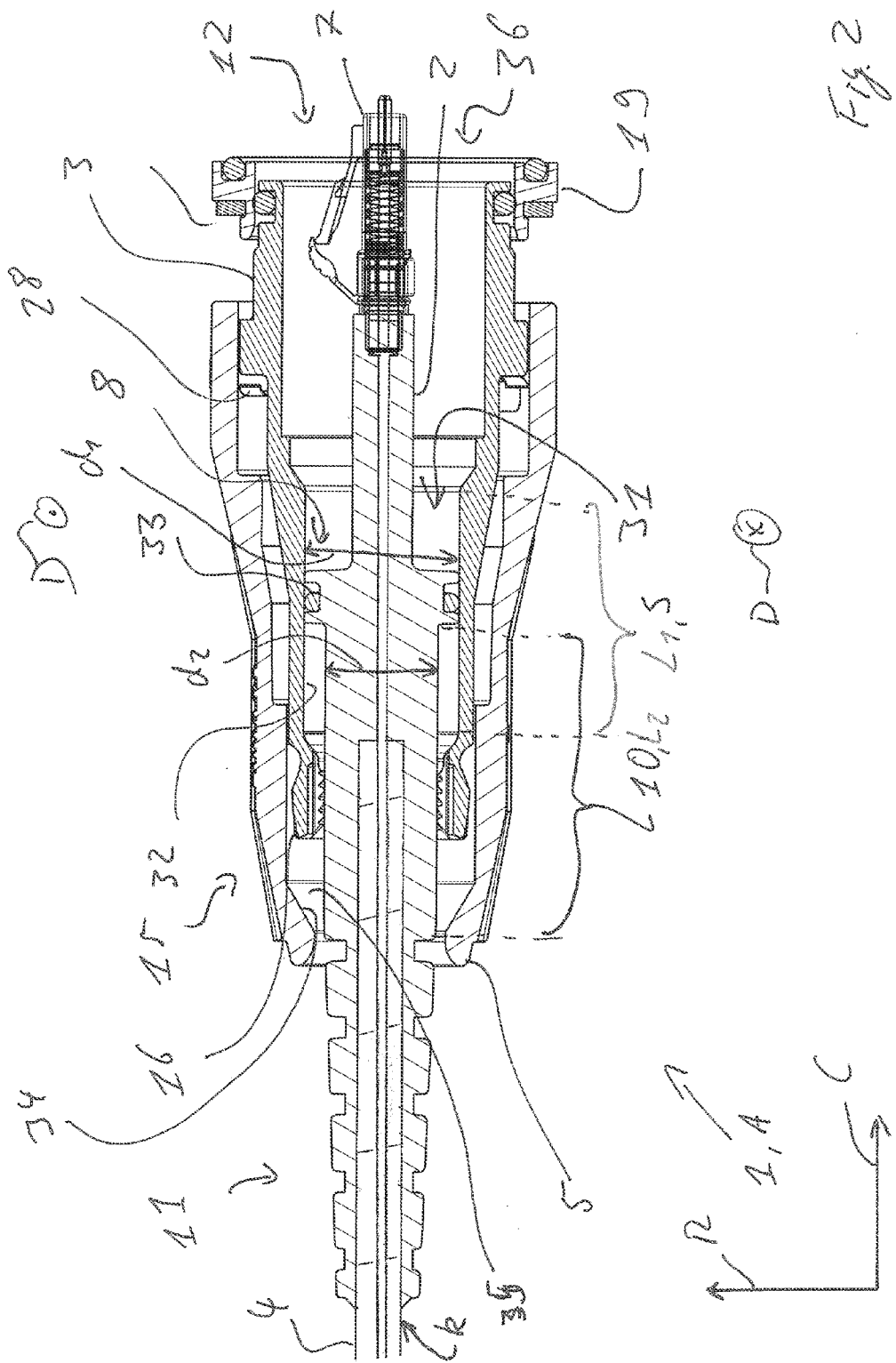
FIG. 2 shows a schematic cross-sectional view of a partly assembled state of the embodiment of FIG. 1A.

First, an enclosure assembly 1 with an end fitting 2 and a sealing enclosure 3 will be described with reference to FIG. 1A. The enclosure assembly 1 is shown in an exploded view. In a connection direction C, the end fitting 2 is arranged behind the sealing enclosure 3. A cable 4 extends in the connection direction C through the sealing enclosure 3 and into a cable channel k of the end fitting 2. Before the sealing enclosure 3, a coupling enclosure 5 is arranged, through which the cable 4 extends.

In the connection direction C, the end fitting 2 may be shaped with a connection end 6. The connection end 6 may be coupled with at least one or even more and for instance two connectors 7 for interconnecting the cable 4 to a counter connector. The cable 4 may thus at least partly extend through the end fitting 2 towards its connection end 6 and a conductive element of the cable 4 may be connected to the at least one connector 7 and may even reach into the connector 7. The cable 4 may for instance comprise an electrical or optical conductive element.

In the connection direction C before the connection end 6, the end fitting 2 may comprise a sealing protrusion 8. The sealing protrusion 8 may sealingly connect the sealing enclosure 3 in an assembled state of the enclosure assembly 1. The sealing protrusion 8 may extend in a radial direction R of the end fitting 2, the radial direction R extending perpendicular to the connection direction C. The sealing protrusion 8 may extend in a circumferential direction D of the end fitting 2 and may even completely extend around the end fitting 2. Hence, the sealing protrusion 8 may be shaped as a sealing ring. The sealing protrusion 8 may comprise a sealing groove 9 for at least sectionwise accommodating a sealing element, e.g. an O-ring. The sealing groove 9 may have an open side O that points in the radial direction R. The open side O may extend in the circumferential direction D completely around the end fitting 2.

In the connection direction C before the sealing protrusion 8, the end fitting 2 may be shaped with a protection section 11, the protection section 11 being adapted to prevent the cable 4 from kinking or overbending when entering the end fitting 2 in the connection direction C.

Between the sealing protrusion 8 and the protection section 11, the end fitting 2 may comprise an affixing section 10 that is adapted to be affixed to the sealing enclosure 3. When affixed to the sealing enclosure 3, the end fitting 2 is protected from unintentional movements in or against the connection direction C and relative to the sealing enclosure 3. Hence, the end fitting 2 and the sealing enclosure 3 may act as a strain relief for the connector 7, preventing that mechanical forces acting on the cable 4 in particular against the connection direction C do not affect the connection of the connector 7 and the counter connector.

The sealing enclosure 3 may be shaped with a cable volume 12 that may extend through the sealing enclosure 3 in the connection direction C and that is open at least in the connection direction C. The end fitting 2 may at least sectionwise be arranged in the cable volume 12 in the assembled state of the enclosure assembly 1 such that the sealing protrusion 8 can sealingly connect the sealing enclosure 3.

For affixing the end fitting 2 to the sealing enclosure 3, the sealing enclosure 3 may be shaped with a retention section 13. The retention section 13 may be arranged at an end 14 of the cable volume 12 facing against the connection direction C. The cable volume 12 may extend through the retention section 13 and may end against the connection direction C flush with the retention section 13.

The retention section 13 may comprise a retention member 15 that may be adapted for affixing the end fitting 2. The retention member 15 may be formed as a retention bushing through which the end fitting 2 may at least sectionwise extend and it may comprise at least one resiliently deflectable holding tongue 16, which may press against the affixing section 10 of the end fitting 2 in a spring-biased member in the assembled state. The end fitting 2 and the sealing enclosure 3 may thereby be interconnected in a form-fit and in particular an in a force-fit manner.

In order to further stabilise and strengthen the affixing connection between the end fitting 2 and the sealing enclosure 3, the retention member 15 may be shaped with at least two, three or more holding tongues 16, which may be arranged in the circumferential direction D around the end 14 of the cable volume 12 in a uniformly distributed manner.

The retention member 15 may be integral part of the sealing enclosure 3 and may e.g. be injected molded together with the sealing enclosure 3.

The at least one holding tongue 16 may have at least one holding element 17 that projects against the radial direction R towards the cable 4, i.e. towards the cable volume 12. The holding element 17 may be part of a group of holding elements 17 which form a holding structure 18 that faces the cable volume 12 and extends along the circumferential and/or connection direction D, C. For instance, the holding element 17 may be formed with at least one apex or edge that points into the cable volume 12 for increasing the pressure acting onto or even piercing the affixing section 10 in the assembled state of the enclosure assembly 1.

At its free end, the at least one holding tongue 16 may be provided with a bevel 17' at the inner surface, i.e. the surface facing the cable 4. The bevel 17' is shaped so as to increase the thickness of the holding tongue in the direction facing away from the free end of the holding tongue 16 towards a root of the holding tongue where the holding tongue is connected to the e.g. tubular main body of the sealing enclosure 3. The bevel 17', at the free end of the holding tongue 16 extends to at least half of the material thickness of the holding tongue 16 including the holding element. Thus, the bevel 17' provides a handling surface to release the holding tongues 16. The bevel 17 at its end facing away from the tip of the holding tongue 16 continues as holding element 17 as shown in FIG. 1B.

The sealing enclosure 3 may not only be adapted to sealingly connect the end fitting 2 but also to sealingly connect a mating closure 19 or the coupling enclosure 5, to which the enclosure assembly 1 may be attachable. An end 20 of the sealing enclosure 3 that faces in the connection direction C may therefore be provided with a further sealing element 21, e.g. in the form of an O-ring.

In order to prevent unintentional rotational movements in or against the circumferential direction D of the sealing enclosure 3 when connected to the mating closure 19, the sealing enclosure 3 may be shaped with at least one receiving pocket 22 that is open at least in the connection direction C. When connected to the mating closure 19, at least one securing nose 23 of the mating closure 19 may engage the at least one receiving pocket 22, thereby blocking rotational movements of the sealing enclosure 3.

For easily connecting the sealing enclosure 3 to the mating closure 19, the amount of receiving pockets 22 may be a multiple in whole numbers of the amount of securing noses 23.

For securing the sealing enclosure 3 and thereby also the end fitting 2 and the connector 7 in the connection direction C and with respect to the mating closure 19, the enclosure assembly 1 may comprise the coupling enclosure 5. The coupling enclosure 5 and the mating closure 19 may be shaped in order to be affixed to each other in a bayonet-manner. The coupling enclosure 5 may be thrown over the sealing enclosure 3 in the connection direction C and may press the sealing enclosure 3 and in particular its further sealing element 20 against the mating closure 19. Additionally or alternatively, a base 25 of the receiving pockets 22 that faces in the connection direction C may be pressed against one of the securing noses 23 in the connection direction C by the coupling enclosure 5.

For pressing the sealing enclosure 3 in the connection direction C, the sealing enclosure 3 may be formed with a pressing face 26 facing against the connection direction C, on which pressing forces from the coupling enclosure 24 act. The pressing face 26 may be arranged on a protrusion 27, which may be a ring protrusion 27 extending parallel to the circumferential direction D. The ring protrusion 27 may also be adapted to form the receiving pockets 22 and may have a crown-like shape, the teeth or prongs of the crown flanking the receiving pockets 22 and pointing in the connection direction C.

In case size tolerances exist in the connection direction C that may negatively affect the connection of the enclosure assembly 1 to the mating closure 19, an annular wave spring 28 may be arranged on the pressing face 26. The wave spring 28 may be elastically deformed in the connection direction C by the coupling enclosure 5 and may generate a resilient pressing force acting in the connection direction C onto the sealing enclosure 3.

In order to prevent the wave spring 28 from getting lost, the sealing enclosure 3 may be provided with a securing protrusion 29, which projects in the radial direction R away from the cable volume 12 and secures the wave spring 28 from movements against the connection direction C.

A stop element 30 may be provided and attached to the cable, the stop element 30 preventing the sealing enclosure 3 or the coupling enclosure 5 from sliding too far along the cable 4 against the connection direction C before assembling the enclosure assembly 1.

FIG. 2 shows the enclosure assembly 1 according to the exemplary embodiment of FIG. 1A in a partly assembled state in a schematic cross-sectional view, the cross-sectional plane extending along the connection direction C. The same reference signs are used for elements which correspond in function and/or structure to the elements of the exemplary embodiment of FIG. 1A.

The enclosure assembly 1 is shown in its partly assembled state A, wherein the coupling enclosure 5 is not yet coupled to the mating closure 19. Compared to the view of FIG. 1A, the sealing enclosure 3 may be moved further in the connection direction C with respect to the end fitting 2. In the state A, the sealing enclosure 3 may be moved so far in the connection direction C and with respect to the end fitting 2 that the sealing protrusion 8 is arranged in a sealing duct 31 formed by an inner sealing wall 32 provided by a sealing section S of the sealing enclosure 3 in the connection direction C. The sealing protrusion 8 may sealingly contact the inner sealing wall 32 and may in particular be sealingly connected to the inner sealing wall 32 by the sealing element 33, e.g. by an O-ring.

The sealing duct 31 may extend in the connection direction C and may have a constant diameter $d_1$ along the connection direction C, such that the sealing connection between the end fitting 2 and the sealing enclosure 3 can be established over a range of relative positions of the end fitting 2 relative to the sealing enclosure 3 in the connection direction C. The length $L_1$ of the sealing duct 31 with the constant diameter $d_1$ may amount to 10, 20, 30, 40, 50 or more percent of the total length of the sealing enclosure 3 in the same direction.

In order to be able to affix the end fitting 2 to the sealing enclosure 3 in the range of relative positions between the end fitting 2 and the sealing enclosure 3 in the connection direction C, the affixing section 10 may extend in the connection direction C and may have a constant diameter $d_2$. The diameter $d_2$ of the affixing section 10 may be sufficient to be affixed to the retention member 15, e.g. by elastically deforming the retention member 15 and in particular to elastically deflect the at least one holding tongue 16. Alternatively, the cable volume 12 in the retention member 15 may have a diameter that essentially equals the diameter $d_2$ of the affixing section 10 or is only slightly larger. The affixing section 10 may have the same, a greater or a smaller length $L_2$ in the connection direction C compared to the sealing duct 31.

In order to affix the end fitting 2 and the sealing enclosure 3 in the relative position to each other, the retention member 15 may additionally or alternatively be elastically deformed by external forces. For instance, the coupling enclosure 5 may be shaped to at least sectionwise press the retention member 15 and in particular its at least one holding tongue 16 against the affixing section 10 at least when the coupling enclosure 5 is coupled to the mating closure 19.

For deforming the retention member 15, the coupling enclosure 5 may be shaped with a tapered pressing surface 34, in particular at its end facing against the connection direction C. According to the embodiment of FIG. 2, the tapered pressing surface 34 may border a conical end 35 of a continuous free volume 36 in the coupling enclosure 5, the free volume 36 extending in the connection direction C and being adapted to at least sectionwise receive the sealing enclosure 3.

In the view of FIG. 2, the further sealing element 21 of the sealing enclosure 3 interconnects the sealing enclosure 3 and the mating closure 19 in a sealing manner.

FIG. 3 shows another exemplary embodiment of the enclosure assembly 1 in a schematic perspective exploded view. The same reference signs are used for elements which correspond in function and/or structure to the elements of the exemplary embodiment of FIGS. 1A and 2. For the sake of brevity, only the differences from the exemplary embodiment of FIGS. 1A and 2 will be looked at.

The embodiment of FIG. 3 differs from the embodiment of FIGS. 1A and 2 in that the retention member 15' is not formed as an integral part of the sealing enclosure 3, but as a separate part. As a separate part, the retention member 15' may be exchangeable for another retention member 15', whose geometry e.g. can be adapted to affix end fittings that differ from the shown end fitting 2.

The retention member 15' may be formed with the at least one holding tongue 16 and may comprise a holding ring 37, to which the at least one holding tongue 16 may be fastened. For instance, the separate retention member 15' may be an injection molded part. The separate retention member 15' may be designated as a removable retention cartridge.

An inner diameter of the holding ring 37 may be dimensioned such that it can be placed onto the affixing section 10. In the assembled state of the enclosure assembly 1, the at least one holding tongue 16 may project from the holding ring 37 against the connection direction C.

In order to couple the separate retention member 15' to the sealing enclosure 3, the sealing enclosure 3 may comprise a retention section 13' that is adapted to hold the retention member 15' in the assembled state of the enclosure assembly 1. The retention section 13' may be provided with at least one holding tongue 16' for clamping the retention member 15'. In particular, the holding ring 37 and the retention section 13' may be formed such that the holding ring 37 can be introduced into the cable volume 12 in the connection direction C and can be held by the retention section 13' in a form- or a force-fit manner.

For limiting the movement of the retention member 15' in the connection section C, the at least one holding tongue 16 of the retention member 15' may protrude from the holding ring 37 in the radial direction R, forming a stop face 38. In the assembled state the stop face 38 may abut against a free end 39 of the holding tongue 16' or a stop element, e.g. a holding protrusion of the sealing enclosure 3 when the retention member 15' is arranged in the cable volume 12.

In order to prevent the retention member 15' from falling out of the retention section 13' and against the connection direction C, the holding ring 37 may comprise an engagement member, e.g. a holding channel 40. The holding channel 40 may open in the radial direction R and may at least sectionwise be limited by the stop face 38 of the holding tongue 16 against the connection direction C. In the connection direction C, the holding channel 40 may end at a further stop face 38' formed by a section 41 of the holding ring 37, the section 41 having a greater wall thickness than the wall thickness in the area of the holding channel 40 and protruding from the holding channel 40 in the radial direction R. The retention member 15' may have a crown-shape with the crown teeth or prongs being formed by several holding tongues 16 pointing against the connection direction C in the assembled state.

FIG. 4 shows the exemplary embodiment of FIG. 3 in the assembled state A', wherein the coupling enclosure 5 is coupled to the mating closure 19.

In the assembled state A', the end fitting 2 may as in the partly assembled state A be arranged in the cable volume 12 such that the sealing protrusion 8 is arranged in the sealing duct 31 and is sealingly connected to the inner sealing wall 32, may be via the sealing element 33 in the form of an O-ring.

In the assembled state A' shown in FIG. 4, the coupling enclosure 5 may be thrown over the sealing enclosure 3 and may be coupled to the mating closure 19. The tapered pressing surface 34 of the coupling enclosure 5 may elastically displace the holding tongue 16' of the sealing enclosure 3 against the radial direction R and towards the cable volume 12. The at least one holding tongue 16' of the sealing enclosure 3 and the holding tongue 16 of the retention member 15' may overlap in the radial direction R, i.e. may be arranged side by side or abreast in the connection direction C. Thus, the displaced holding tongue 16' may be pressed against the holding tongue of the retention member 15' against the radial direction R, thereby elastically deflecting the holding tongue 16 towards the cable volume 12 and against the radial direction R.

Alternatively, if the holding tongues 16' are omitted, the holding tongues 16 may be in direct contact to the tapered pressing surface 34. As the end fitting 2 and in particular its affixing section 10 may be arranged next to the holding tongue 16, the holding tongue 16 may be pressed against the affixing section 10, thereby affixing the end fitting 2 in a force-fit manner. For instance, the end fitting 2 may locally be deformed by the holding tongue 6 or vice versa, resulting in an additional form-fit.

In the connection direction C behind the holding tongue 16', the sealing enclosure 3 may comprise the stop element, for instance in form of an engagement member, e.g. a holding protrusion 42, which may be adapted to engage with the engagement member of the retention member 15', e.g. into the holding channel 40 and to hold the retention member 15' in a form-fit manner. The retention member 15' may be snap-fitted to the sealing enclosure 3.

What is claimed is:

1. End fitting for a cable with a cable channel extending in a connection direction towards a connection end of the end fitting in which the cable can at least sectionwise be arranged, wherein the end fitting is shaped with a sealing protrusion and/or a sealing groove for sealingly connecting a sealing enclosure of an enclosure assembly, the sealing protrusion and/or the sealing groove extending away from the cable channel in a radial direction of the end fitting, and the end fitting including an extended portion positioned outward of the sealing enclosure and extending in a direction opposite the connection direction, the extended portion including the cable channel.

2. End fitting according to claim 1, wherein the sealing protrusion extends in a circumferential direction of the end fitting.

3. End fitting according to claim 1, wherein the sealing protrusion comprises the sealing groove for at least sectionwise accommodating a sealing element, the sealing groove having an open side that points in the radial direction of the end fitting.

4. End fitting according to claim 1, wherein the end fitting is formed with an affixing section that is adapted to be affixed to the sealing enclosure, the affixing section and the sealing protrusion and/or the sealing groove being arranged one after the other in the connection direction.

5. End fitting according to claim 1, wherein the end fitting is coupled to the cable, and the coupling between the end fitting and the cable is an injection molded coupling.

6. End fitting according to claim 1, wherein the end fitting is shaped as a bend protection for a cable.

7. Enclosure assembly for connecting a cable to a mating closure, the enclosure assembly comprising a sealing enclosure with a cable volume adapted to at least sectionwise receive an end fitting for a cable, the cable volume being open at least in a connection direction, in which the enclosure assembly can be connected to the mating closure, the enclosure assembly further comprising the end fitting for the cable, the end fitting extending into the cable volume of the sealing enclosure and being affixed and sealingly connected to the sealing enclosure in an assembled state of the enclosure assembly, wherein the end fitting is formed according to claim 1, and wherein the sealing enclosure comprises a sealing section for sealingly connecting the end fitting and a retention section for affixing the end fitting, the sealing section and the retention section being arranged one behind the other in the connection direction.

8. Enclosure assembly according to claim 7, wherein the sealing section comprises an inner sealing wall that surrounds the cable volume in the radial direction and forms a sealing duct.

9. Enclosure assembly according to claim 8, wherein the sealing protrusion of the end fitting or a sealing element at least sectionwise accommodated in the sealing groove is sealingly connected to the inner sealing wall of the sealing enclosure.

10. Enclosure assembly according to claim 7, wherein the retention section is arranged at an end of the cable volume facing against the connection direction.

11. Enclosure assembly according to claim 7, wherein the retention section comprises a retention member with at least one resiliently deflectable holding tongue for holding the end fitting, the at least one resiliently deflectable holding tongue is integrally formed with the retention member, and that the retention member affixes the end fitting at its affixing section relative to the sealing enclosure in the assembled state.

12. Enclosure assembly according to claim 11, wherein the retention member is integrally formed with the sealing enclosure.

13. Enclosure assembly according to claim 11, wherein the retention member is formed as a retention bushing.

14. Enclosure assembly according to claim 11, wherein the retention member is shaped as a removable retention cartridge that can be assembled with the sealing enclosure in the connection direction.

15. Enclosure assembly according to claim 7, wherein the enclosure assembly comprises a coupling enclosure via which the sealing enclosure can be coupled to the mating closure.

16. An enclosure assembly comprising:
an end fitting configured to couple with a cable and including:
- a cable channel extending in a connection direction towards a connection end of the end fitting, the cable channel having a diameter in which the cable can at least sectionwise be arranged, and the coupling between the end fitting and the cable being an injection molded coupling;
- a connector channel parallel to the cable channel and intersecting the cable channel, the connector channel having a diameter configured to receive an electrical connector, the diameter of the cable channel being greater than the diameter of the connector channel; and
- a sealing protrusion and/or a sealing groove being included on the end fitting and extending away from the cable channel in a radial direction of the end fitting; and a sealing enclosure of an enclosure assembly being configured to sealingly connect with the sealing protrusion and/or the sealing groove.

17. The end fitting of claim 1, wherein a length of the end fitting is greater than that of the sealing enclosure.

* * * * *